May 27, 1958 G. L. HOWITT ET AL 2,836,761
DYNAMIC CONVERGENCE APPARATUS FOR
COLOR TELEVISION RECEIVER
Filed Dec. 10, 1954 2 Sheets-Sheet 1

INVENTORS
GEORGE L. HOWITT
ABRAHAM A. GOLDBERG
BY Campbell, Brumbaugh, Free & Graves
THEIR ATTORNEYS INVENTORS
GEORGE L. HOWITT
ABRAHAM A. GOLDBERG
BY Campbell, Brumbaugh, Free & Graves
THEIR ATTORNEYS

United States Patent Office 2,836,761

Patented May 27, 1958

2,836,761

DYNAMIC CONVERGENCE APPARATUS FOR COLOR TELEVISION RECEIVER

George L. Howitt, River Edge, and Abraham A. Goldberg, Teaneck, N. J., assignors to Columbia Broadcasting System, Inc., New York, N. Y., a corporation of New York Application December 10, 1954, Serial No. 474,508

9 Claims. (Cl. 315—13)

This invention relates generally to color television systems employing a multiple electron beam color tube, and more particularly to dynamic convergence apparatus for the color tubes of such systems.

As is well known, in the case of color television systems employing color tubes of the sort mentioned above, it is necessary that the electron beams of the tube be dynamically converged by signals which are functions of the beam deflections occurring during the two picture scans (horizontal and vertical) which cooperate to generate the frame image of the tube. Also, since the color tube is not perfectly symmetrical either geometrically or electrically, it is necessary to adapt the dynamic convergence signal characteristics to the particular operative characteristics of the tube with which the signal is used.

The circuits known to the prior art for generating dynamic convergence signals as functions of beam deflection involve more circuits stages and component parts than are desirable, with the attendant disadvantages that the circuits have an undesirably high cost of fabrication and occupy space which could be put to better use. Moreover, the nature of the prior art circuits are such that they drain an undesirable amount of power from the system. As additional disadvantageous factors, the prior art circuits are unduly complicated in their arrangements for obtaining the mentioned adaption of the dynamic convergence signals, are susceptible to instability in operating characteristic such that the characteristics of the signals may drift undesirably over a time period, and are relatively inflexible with regard to the feature of obtaining either simultaneous adjustment or individual adjustment of the characteristics of a plurality of dynamic convergence signals.

It is accordingly an object of the invention to provide dynamic convergence apparatus free of the above noted disadvantages of the prior art.

Another object of the invention is to provide apparatus of the above noted character which is simple in nature, occupies little space and has a low cost of fabrication.

Yet another object of the invention is to provide apparatus of the above noted character requiring a minimum amount of power.

A further object of the invention is to provide apparatus of the above noted character having highly stable operating characteristics over a long time period.

A further object of the invention is to provide apparatus of the above noted character permitting adaption of the dynamic convergence signals to the characteristics of the tube in a relatively simple manner.

A still further object of the invention is to provide apparatus of the above noted character which has flexible selectivity between simultaneous and individual adjustment of a plurality of dynamic convergence signals.

These and other objects of the invention are obtained by providing an electron beam deflecting means, a tuned circuit means and a source of pulses occurring in synchronous relation with the periods of a picture scan, the foregoing elements being utilized in conjunction with a color television tube operable by multiple electron beams converging to a common point. The beam deflecting means is preferably though not necessarily in the form of a plurality of electromagnets adapted by deflecting respective ones of the tube electron beams to shift the convergence point thereof in the tube axis direction. The tuned circuit means, which is sustentive of oscillations at the frequency of a picture scan, is coupled with the beam deflecting means such that the mentioned oscillations energize the beam deflecting means as a dynamic convergence signal. The pulse source is coupled with the tuned circuit means to synchronize the oscillations thereof by the pulses from the source. When so synchronized, the oscillations of the tuned circuit means as applied to the beam deflecting means take the form of a cosine signal during the periods of the picture scan. As later described a cosine signal represents an adequate dynamic convergence signal and is accompanied by a number of collateral advantages.

As a feature in accordance with the present invention, the tuning of the mentioned tuned circuit means may be varied to cause a cosine current phase shift during picture scanning periods. By means of this cosine current phase shift the dynamic convergence signal may be adapted to the particular characteristics of the tube with which used. As another feature of the invention the cosine current amplitude may be selectively varied as another controllable factor entering into the mentioned adaption of the dynamic convergence signal.

The invention may be better understood from the following detailed description of a representative embodiment thereof taken in conjunction with the accompanying drawings wherein.

It will be understood that elements designated by similar numerals (but with distinguishing prime superscripts) in the following description are counterparts, and that, accordingly, unless the context otherwise requires, the description of one element applies as properly to other elements with a similar numerical designation.

Figure 1:
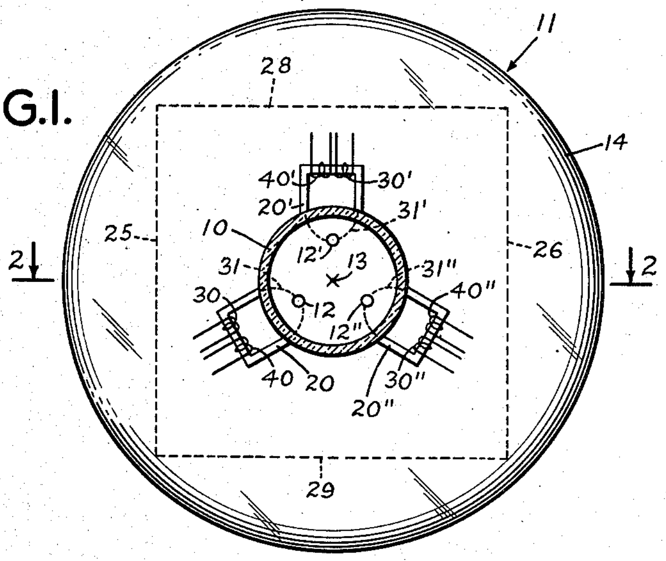
Figure 1 is a sectional view taken through the neck of a multiple beam color television tube and looking from the cross sectioned neck of the tube towards the faceplate thereof.

Referring now to Figure 1, the numeral 10 designates the neck of a multiple beam color television tube 11. Within the neck are shown the green, blue and red electron beams 12, 12′ and 12″ symmetrically disposed about the axis 13 of the tube. For proper tube operation the three electron beams must, from their separate positions in neck 10, converge at any instant of time to a common point which in practice is located at the well-known shadow mask (not shown) of the tube but which for the purpose of explaining the present invention can be considered as having a proper location when located at the image sustaining faceplace 14 of the color tube.

Figure 2:
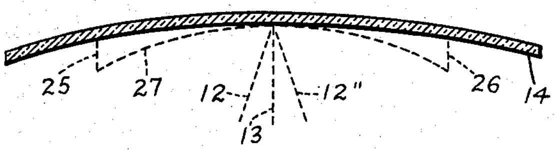
Figure 2 is a cross sectional view of the faceplate of the tube taken along the lines 2—2 in Figure 1.

Convergence of the three beams is attained to a large extent by means of a "static convergence" action in which permanent magnets or the electromagnets 20, 20′, 20″ of Fig. 1, exert constant value magnetic fields upon the beams such that at any instant of the horizontal and vertical scanning actions of the tube, the beams converge to a common point. Preferably the static convergence fields are of a value so that when the convergence point lies on the axis 13 of tube 11, the convergence point, as shown in Figure 2, is located exactly at the faceplate 14 of the tube. Thus static convergence alone converges the beams to a proper location at the instant when the beams in the course of generating a given frame image on faceplate 14 are simultaneously in the center of a horizontal scan and at the center of the vertical scan for the the given frame.

It has been found, however, that, if the static convergence effect is proportioned to exactly locate the convergence point relative to the faceplate when the convergence point lies in axis 13, the convergence points for other scanning positions will draw away from the faceplate 14. Thus, as shown in Figure 2, as the horizontal scan through axis 13 progresses from the left hand margin 25 to the right hand margin 26 of a generated image frame, the locus 27 of static convergence points progresses in relation to the faceplate from maximum separation at margin 25 to minimum separation at the center of the scan and back to maximum separation at margin 26. A similar discrepency (not shown) between the convergence point locus and the faceplate occurs during a vertical scan progressing from one to the other of the margins 28, 29 for the frame image.

To correct for the described inadequacy of static convergence alone, it is the usual practice to give the electron beams a further "dynamic convergence" component of deflection which is additive with that produced by static convergence such that both forms of convergence together cause the locus of convergence points to exactly coincide in spatial location with the faceplate 14. Such dynamic convergence is accomplished, for example, by energizing through respective windings 30, 30′, 30″ the electromagnets 20, 20′, 20″ with D. C. currents or current components which vary with the amount of deflection of the beams in scan to produce the proper dynamic convergence fields 31, 31′, 31″ for the electromagnets. In operation, these dynamic convergence currents increase the fields from the electromagnets to draw the electron beams respectively associated therewith radially outwardly of the axis 13 in due proportion with the strength of the dynamic convergence currents. This radially outward deflection of the beams 12, 12′, 12″ in turn shifts the convergence point of the beams forward towards faceplate 14 in a direction paralleling the axis of the tube. It follows that the dynamic convergence currents should be of maximum value at the beginning and end of a scan and of minimum value at the center of a scan.

Figure 3:
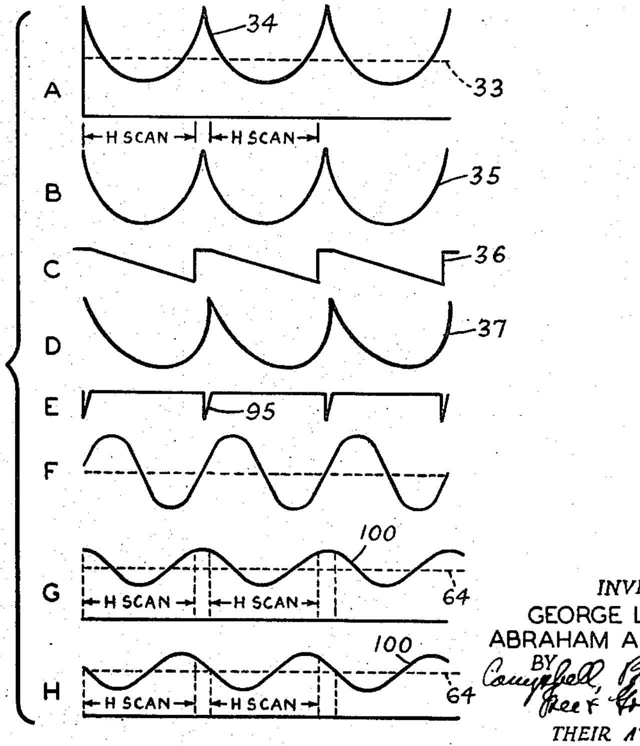
Figure 3 is a view of certain wave forms of aid in explaining the present invention.

To develop an adequate dynamic convergence effect, it has previously been through necessary for the magnetic fields exerted by the electromagnets 20, 20′, 20″ to each vary as a parabola over the period of a given scan. Thus, according to prior practice, in each horizontal scan the field of electromagnet 20 should vary as shown in Figure 3, wave form A, the net field being a superposition of a constant static convergence field 33 (generated by constant value D. C. current through coil 30) and a dynamic convergence field 34 varying parabolically during each horizontal scan. Such dynamic convergence field 34 is of course generated by a parabolic current component 35 (Figure 3, wave form B) flowing through the coil 30.

The parabolas of the dynamic field 34 shown in Figure 3, wave form A, are symmetrical during each horizontal scanning period in that the minimum point of each parabola occurs at the exact center of a horizontal scan. Since a color tube, however, is not usually exactly symmetrical in its geometry in a structural sense, since the electromagnets 20, 20′, 20″ may not act exactly proportionally upon their respective electron beams, and since other unsymmetrical forces may act upon these beams, it becomes necessary, in order to adapt the dynamic convergence effect of the electromagnets to the characteristics of a particular tube, to provide for adjustment in amplitude and shape of the respective parabolic fields. Adjustment in shape according to prior art practice is commonly accomplished by adding to parabolic current 35 (Figure 3, wave form B) a saw tooth current 36 of variable slope (Figure 3, wave form C) such that when the slope is positive going, zero, and negative going, the parabolas of the current 35 will be tilted in one direction, not at all, and in the other direction. Thus, the addition current of wave forms B and C in Figure 3 produce a dynamic convergence current 37 of tilted parabolas as shown in Figure 3, wave form D. The addition of these wave forms may take place by flowing separate parabolic and saw tooth current components through the coil 30.

While the above considerations have been confined to currents producing dynamic convergence correction in horizontal scan, it will be appreciated that the same considerations apply to the problem of obtaining dynamic convergence correction in vertical scan. For example, the coils 30, 30′, 30″ of the electromagnets in Figure 1, in addition to being energized by static convergence current, and horizontal scan parabolic current, may also be energized by a vertical scan dynamic convergence current (not shown) of parabolic wave form similar in shape to that shown in Figure 3, wave form A, but extending in time over an entire vertical scan. To provide for vertical parabolic tilting the electromagnets 20, 20′, 20″ may be energized by saw tooth vertical tilting current carried by the separate coils 40, 40′, 40″.

Figures 4, 5:
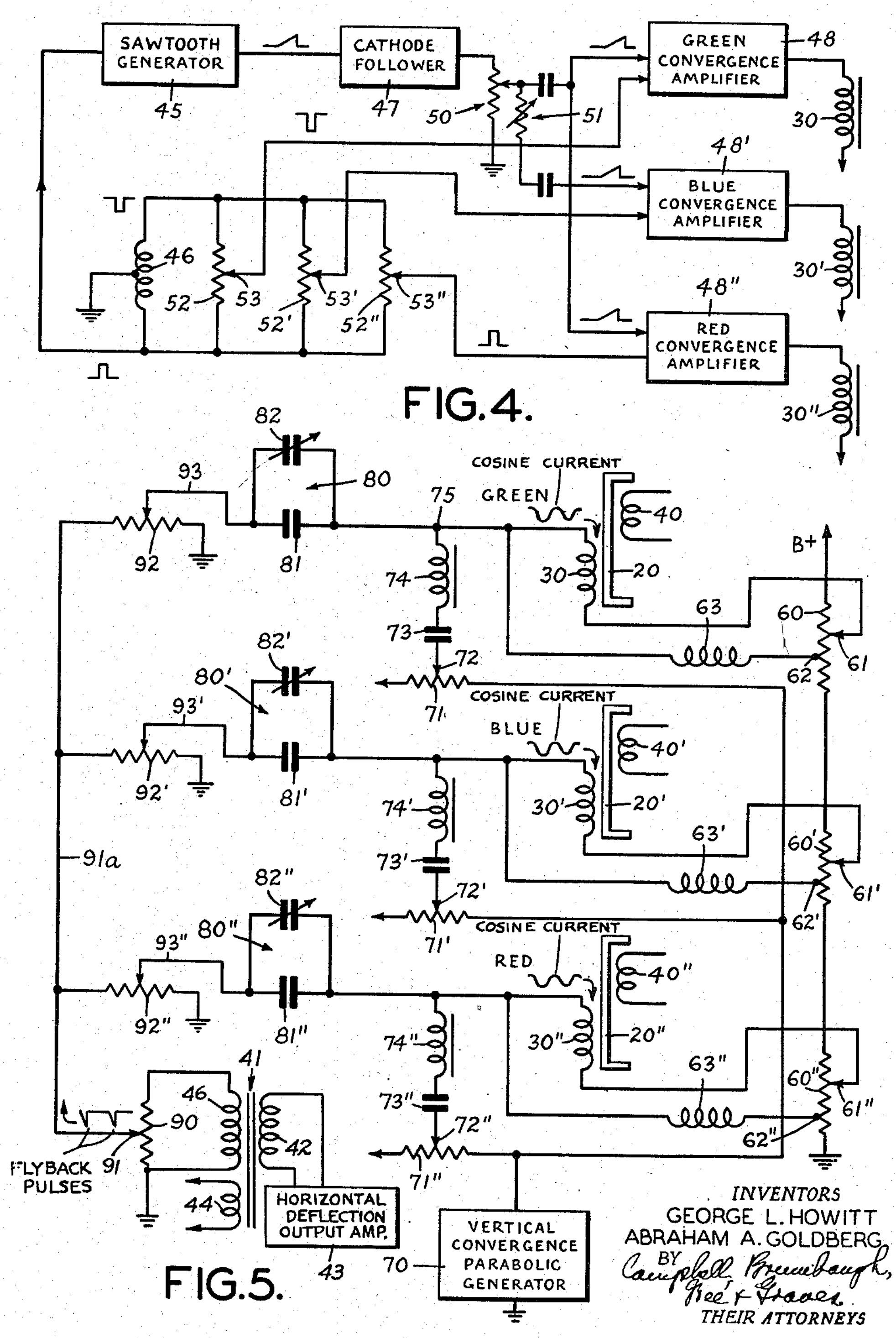
Figure 4 is a diagram partly in schematic and partly in block of the prior art practice with respect to dynamic convergence apparatus.
Figure 5 is a diagram partly in schematic and partly in block of an embodiment of the present invention.

In Figure 4, which shows the prior art arrangement for obtaining horizontal parabolic current and horizontal tilting current through the electromagnet coils 30, 30′, 30″, a saw tooth generator stage 45 is coupled with a winding 46 representing a source of the well known flyback pulses which occur at the end of each horizontal scan. As shown in Figure 5, winding 46 may be, say, one secondary winding of a horizontal deflection output transformer 41 which is driven through its primary winding 42 by the horizontal deflection amplifier 43, and which has another secondary winding 44 for driving the horizontal deflection yoke (not shown) of the cathode ray tube of the television receiver. The flyback pulses are fed from winding 46 to generator 45 to synchronize the action thereof such that a saw tooth wave is generated over the interval of each horizontal scan. These saw tooth waves are fed through a cathode follower 47 to be distributed therefrom as first inputs to the green, blue and red inverting convergence amplifiers 48, 48′, 48″. Interposed in circuit between the cathode follower and the convergence amplifiers are the gain controls 50 and and 51, respectively, providing for amplitude adjustment of the saw tooth waves reaching the amplifiers.

The amplifiers 48, 48′, 48″ receive respective second inputs in the following manner. The winding 46 is center tapped to ground. Across winding 46 are connected in parallel the three resistors 52, 52′, 52″ having the respective sliding taps 53, 53′, 53″. From the organization of the mentioned winding, resistors and taps, it will be seen that the amplitude of a flyback pulse appearing on any tap can be made positive, zero, or negative in dependence on the slide setting of the tap on its resistor. The taps 53, 53′, 53″ are, respectively, coupled with the convergence amplifiers 48, 48′, 48″ to supply the second inputs thereto.

The output of each convergence amplifier is in the form of a superposition of a saw tooth voltage and a flyback pulse preselected to have a given polarity and amplitude or zero amplitude as the case may be. As is well known, when the saw tooth voltages at the outputs of the amplifiers are applied across the electromagnet coils 30, 30′, 30″, the effect of the saw tooth voltages will be to generate parabolic currents in these coils. As is also well known, when the pulse voltages at the outputs of the amplifiers are applied across the electromagnet coils, the effect of the pulse voltages will be to generate saw tooth current in the coils of positive going, zero, and negative going slope when the pulses are respectively of one polarity, zero amplitude and another polarity. In this manner, the prior art develops the tilted parabolic horizontal current shown in Figure 3, wave form D.

From the foregoing description it will be evident that the prior art circuit of Figure 4 is subject to all the disadvantages mentioned above. In particular, it should be mentioned that, since the saw tooth generator 45, cathode follower 47 and convergence amplifiers 48, 48', 48" each utilize electron tubes, each of the stages will consume considerably more power than is represented by useful output. Moreover, because of the well known change in electron tube operating characteristics with age, the characteristics of the dynamic convergence signals developed by the Figure 4 circuit are likely to drift with long time operation. These and the other mentioned disadvantages are alleviated by the present invention.

Referring now to the embodiment of the invention depicted in Figure 5, since the circuit components associated with the "green" electromagnet are typical, a description of these components, except as otherwise noted, also suffices as a description for the others. As shown in the figure, the green electromagnet coil 30 is connected across a variable size portion of a resistor 60 by means of a pair of sliding taps 61 and 62 respectively interposed between the resistor and the separate ends of the coil. To forestall the creation of a shunt path around the coil 30 for A. C. signals, a choke inductance 63 is interposed in circuit between the coil and the tap 62. The reisistor 60 develops a D. C. voltage across its terminals by connection of this resistor in series with resistors 60' and 60" between a positive voltage supply and ground. Hence, a constant D. C. current of a value fixed by the settings of taps 61 and 62 will flow through the coil 30. This constant D. C. current in coil 30 energizes the electromagnet 20 to exert a static convergence field 64 (Figure 3, wave form G) upon the electron beam 12.

The coil 30 is utilized to vary the field of electromagnet 20 such that the electromagnet obtains not only complete horizontal dynamic convergence but, in addition, generates the symmetrical parabolic field component necessary for vertical dynamic convergence. For purposes of generating this last named component, a conventional vertical convergence parabolic generator 70 develops a corresponding parabolic voltage across a resistor 71. This vertical parabolic voltage is coupled across coil 30 in variable amount by a tap 72 slidable over the resistor and by a D. C. blocking capacitor 73 and choke winding 74 connected in series between tap 72 and the junction 75 of coil 30 with choke inductance 63. Capacitor 73 and choke 74, respectively, act to prevent D. C. current and A. C. current from being shunted around coil 30. Because of the low inductance of coil 30 at vertical scanning frequency, the vertical parabolic voltage impressed across coil 30 causes a current flow of corresponding parabolic characteristic through the coil.

The vertical dynamic convergence field exerted by the electromagnet 20 from flow of vertical parabola current in coil 30 will vary as a symmetric parabola over each vertical scanning period. To introduce asymmetry into the vertical dynamic convergence field the coil 40, wound on electromagnet 20, is energized in a well known manner with a variable slope saw tooth current. This saw tooth current exerts a field component which tilts the parabolic variations of the vertical dynamic convergence field in a manner like that shown by wave forms B, C and D (Figure 3).

The above described connections for the embodiment of Figure 5 are for the most part conventional. In accordance with the invention, the electromagnet has connected therewith at the junction 75 a capacitance 80 including a fixed capacitor 81 and a variable capacitor 82. Capacitance 80 by virtue of the described connection forms a network in which, for the oscillations about to be described, the capacitance is in series with the parallel connection of the electromagnet coil 30 and the circuit path to ground which includes the choke winding 74 and the generator 70. Moreover, the capacitance 80 in this network is tuned to the effective inductance of the coil and choke winding together to render the described network sustentive of oscillations at the horizontal scanning frequency. The inductance of choke 63 is so large relative to the inductances of coil 30 and choke winding 74 that the first named inductance has a negligible effect upon the oscillations of the tuned circuit means described above.

For creation of the above described oscillations there is utilized a source which provides pulses occurring in synchronous relation with the start times of horizontal scanning periods. Preferably, as shown in Figure 5, this source is the winding 46 acting as a source of flyback pulses. The flyback pulses, appearing as a voltage across winding 46, are impressed across a resistor 90 having the variable tap 91. Tap 91 in turn is coupled, through pulse conducting means in the form of the lead 91*a*, the variable resistor 92 and the lead 93, to the end of capacitance 80 which also is the end of the described tuned network. By virtue of the described coupling between winding 46 and the network, a circuit is created for the flow of flyback pulses through the network.

Similar couplings are provided between winding 46 and the networks associated with the electromagnet coils 30' and 30". Thus, the pulse source 46 is separately coupled by distributory circuit means with respective pulse circuits through each of the three tuned networks.

If the pulse source is, as is preferable, a flyback pulse source, the pulses developed will occur at horizontal scanning frequency and at a time just before the start of each horizontal scan. This situation is shown by the pulses 95 of Figure 3, wave form E. As is well known such pulses will have the first effect of shock exciting the tuned network including capacitance 80 into generating oscillations at horizontal scanning frequency. It will be noted that the only energy required to sustain the oscillation swings is that furnished by the pulses alone, the advantage accruing that the described embodiment represents a minimum power drain on the television system in which it is incorporated.

As a second effect the flyback pulses synchronize the oscillations to have a predeterminable phase relation with the tuning of the horizontal scanning periods. This particular phase relation occurs for the reason, first, that the flyback pulses are themselves synchronized with the horizontal scanning periods. Secondly, the starting times of the cycles of the oscillations developed by the flyback pulses will, in a well-known manner, slightly lead, coincide or slightly lag in phase the flyback pulses, in dependence on whether the shock excited circuit is tuned to have its resonant peak lie to one side of, coincide with, and lie to the other side of the horizontal scanning frequency. Thus, for example, if the network including capacitance 80 is tuned to have its resonant peak exactly at horizontal scanning frequency, the voltage signal of the network oscillations will be a sine wave voltage which has a zero value (starts an oscillation cycle) in time coincidence with the flyback pulses. Such sine wave voltage is shown by Figure 3, wave form F.

As is well known, a sine wave voltage impressed across an inductance will create a sinusoidal current in the inductance having a 90° phase shift with respect to the voltage. Hence, the sine wave voltage of Figure 3, wave form F, will create in electromagnet coil 30 a current which (to a few degrees of phase shift more or less) is a cosine current with respect to the timing established by the horizontal scanning periods. In other words, the current developed in coil 30 by the oscillations of the associated network will have a minimum at or somewhere near the center times of horizontal scanning periods. It follows that the current will have maximums at or somewhere near the beginning and end times of horizontal scanning periods.

Since in each horizontal scanning cycle the larger horizontal scaning period must share the cycle with a considerably shorter flyback period, and since the flyback pulses themselves are not exactly coincident with the starting times of the horizontal scanning periods, if the oscillatory network including capacitance 80 is tuned to a resonant peak exactly at horizontal scanning frequency, the minimum values of cosine current will be somewhat offset from the center times of the scanning periods. Hence, if coincidence is desired between the mentioned minimum values and center times, the variable capacitor 82 may be used to detune the network slightly. Detuning of the network causes a cosine current phase shift in an amount which may be selected to establish the desired coincidence. When such coincidence exists, the electromagnet 20, as shown in Figure 3, wave form G, will exert a horizontal dynamic convergence field 100 which varies symmetrically over the time intervals of horizontal scanning periods.

It has been found that for correction of the discrepancy between the static convergence point locus and the face-plate contour, a dynamic convergence field having a cosine variation is fully as satisfactory as the parabolic variation used by the prior art. Moreover, it is not electrically difficult to generate a cosine variation field and the dynamic convergence apparatus of the present invention may take the simple form shown in Figure 5 with the attendant advantages, among others, that the apparatus requires a minimum number of components and will be operatively stable over long periods of time.

As stated heretofore, because of asymmetries in the structure and electrical characteristics of the color tube with which dynamic convergence is employed, it is often necessary for proper compensation that the dynamic convergence fields exerted by the electromagnets 20, 20′, 20″ be made asymmetrical. In this regard, it should be noted that sometimes the same field asymmetries should be applied to all three electron beams as, say, when there is a common misalignment between the geometry of all the electron beams and the geometry of the tube. At other times, it is necessary to introduce different field asymmetries for different beams in order to compensate for individual differences between the beams with regard to, say, the strength of field coupling with their respective electromagnets. When different field asymmetries are required, the problem of compensating one beam becomes interrelated with the problem of compensating the others, since a desired field asymmetry introduced for one beam may alone cause an undesired shift in the position of the convergence point. This extraneous shift must be corrected for by changing the dynamic convergence fields for the other beams.

As one mode of introducing the mentioned asymmetry into the tuned network including capacitance 80, the variable capacitor 82 may be adjusted to tune the network such that it has its resonant peak either exactly at horizontal scanning frequency or slightly offset to one side or the other of this frequency. By so tuning the network, the phase of the cosine current through coil 30 may be shifted in a selected amount away from the phase value where the minimum of the dynamic convergence field coincides with the center time of the horizontal scanning period. The effect of this phase shift is, as shown in Figure 3, wave form H, to distort the shape of the dynamic convergence field variation over the scanning period. The correction effect afforded by this change in shape is as satisfactory as that afforded by "parabolic tilting," the heretofore described practice of the prior art.

As another factor injecting asymmetry into the dynamic convergence fields, the amplitudes of the cosine currents may be adjusted. As mentioned, in some instances it is desirable to obtain simultaneous adjustment of all three fields. Such simultaneous amplitude adjustment may be obtained by sliding the tap 91 over the resistor 90. In other instances where individual adjustment is desired, such may be obtained by individually varying the resistance values of the resistors 92, 92′, 92″, respectively. The invention thus provides flexibility of choice between simultaneous and individual amplitude adjustment.

It will be noted that an interrelation exists between the cosine current phase shift and amplitude adjustments necessary to obtain a dynamic convergence field of a particular amplitude and shape characteristic. This observation follows from the fact that as the network includes capacitance 80 is detuned off exact resonance at horizontal scanning frequency, the cosine current while undergoing the described phase shift will also undergo a decrease in amplitude. This amplitude decreases if extraneous must be corrected for by use of the described means for amplitude adjustment.

The above described embodiment of the invention being exemplary only, it will be understood that the present invention comprehends embodiments differing in organization or in detail from the described embodiment. For example, the tuned network including capacitance 80 may be tuned by a variable inductance choke winding 74 rather than by the variable capacitor 82. While the present invention has been described in terms of horizontal dynamic convergence fields, the invention is also applicable to vertical dynamic convergence fields. Further, while the invention has been described in terms of capacitance means in the form of three capacitances which yield tuned circuit means with dynamic convergence beam-deflecting means in the form of three electromagnets, it will be evident that the invention is also applicable to other forms of capacitance means, tuned circuit means and dynamic-convergence beam deflecting means. Accordingly, the invention is not to be considered as limited save as is consonant with the scope of the following claims.

We claim:

1. Dynamic convergence apparatus for a color television tube operable by multiple electron beams converging to a common point, said apparatus comprising, an electromagnet responsive to current in a circuit for deflecting one of said electron beams as a concomitant to shifting said convergence point in the tube axis direction, a capacitance coupled with said electromagnet in tuned relation with the inductance of said circuit to render said circuit oscillatory at horizontal scanning frequency, and a source of fly back pulses coupled with said capacitance and electromagnet in series for shock exciting said circuit into generating oscillations in the form of cosine current through said electromagnet during horizontal scanning periods.

2. Dynamic convergence apparatus for a color television tube operable by multiple electron beams converging to a common point, said apparatus comprising, a plurality of circuits respectively corresponding to said beams and each forming a primarily resistive load, a plurality of electromagnets respectively in said circuits to deflect the corresponding ones of said electron beams, said electromagnets being responsive to like currents in their repective circuits to conjointly shift said convergence point in the tube axis direction, a plurality of capacitances respectively coupled in series in said circuits with said electromagnets and in tuned relation with the respective inductances of said circuits to render each circuit oscillatory at horizontal scanning frequency, and a source of fly back pulses separately connected with each coupled electromagnet and capacitance in series and coupled across each primarily resistive load respectively formed by said circuits for shock exciting said circuits into generating synchronous oscillations in the form of respective cosine currents through said electromagnets during horizontal scanning periods.

3. Dynamic convergence apparatus as in claim 2 further characterized by tuning means in at least one of said circuits for tuning said circuit at horizontal scanning frequency to produce a selective phase shift between the cosine current of said one circuit and the cosine current of another of said circuits.

4. Dynamic convergence apparatus as in claim 2 further characterized by respective cosine current gain controls for said electromagnet-capacitance circuits, each gain control being interposed between its respective circuit and the fly back pulse source to vary individually the amplitude of the fly back pulses shock exciting the respective circuit.

5. Dynamic convergence apparatus for a color television receiver having a color tube operable by multiple electron beams converging to a common point, respective dynamic convergence electromagnets for said beams and a fly back pulse source, said apparatus comprising, a plurality of circuits each forming a primarily resistive load and each including one of said electromagnets, a plurality of capacitances respectively coupled in series in said circuits with said electromagnets, each capacitance being tuned with the inductance of its circuit to render the circuit oscillatory at horizontal scanning frequency, and distributory circuit means connected between said source and said electromagnet-capacitance circuits to separately couple said fly back pulses with each associated electromagnet and capacitance in series network relation and to couple said source across each of the primarily resistive loads respectively formed by said circuits, said fly back pulses shock exciting the respective electromagnet-capacitance circuits into generating oscillations in the form of cosine currents through said electromagnets during horizontal scanning periods.

6. Dynamic convergence apparatus as in claim 2 further characterized by a plurality of tuning means respectively connected in said electromagnet-capacitance circuits for varying the tuning thereof at horizontal scanning frequency to produce selected phase shifts between the respective cosine currents of said circuits.

7. Dynamic convergence apparatus as in claim 5 further characterized by respective variable resistors for said electromagnet-capacitance circuits, each resistor being interposed between its respective circuit and said source for individually varying the amplitude of fly back pulses shock exciting the respective circuit to accordingly vary the cosine current amplitude of the respective circuit.

8. Dynamic convergence apparatus as in claim 7 further characterized by an additional variable resistor between said source and all said electromagnet-capacitance circuits to simultaneously vary the cosine current amplitudes thereof.

9. Dynamic convergence apparatus for a color television receiver having a color tube operable by multiple electron beams, a fly back pulse source, dynamic convergence electromagnets, and choke windings respectively connected with said electromagnets to supply vertical convergence currents therethrough, said apparatus comprising, a plurality of circuits each forming a primarily resistive load and each including one of said electromagnets and the choke winding associated therewith, a plurality of capacitances each including a fixed capacitor and a variable capacitor, said capacitances being respectively connected in said circuits to the junctions of the electromagnets and the choke windings respectively therein, each capacitance being tunable with the combined inductance of the respective electromagnet and choke winding to oscillate therewith at horizontal scanning frequency, distributory circuit means connected between said source and each of said respective circuits to separately connect said source across respective networks each comprised of a capacitance in series with the parallel connection of the respectively associated electromagnet and choke winding and to connect said source across each of the primarily resistive loads respectively formed by said circuits, and a plurality of variable resistors each interposed in a respective one of the circuits between said source and the current path which consists of the capacitance and electromagnet of the circuit.

References Cited in the file of this patent

UNITED STATES PATENTS

| | | |
|---|---|---|
| 2,410,721 | Dome | Nov. 5, 1946 |
| 2,672,574 | Evans | Mar. 16, 1954 |
| 2,677,779 | Goodrich | May 4, 1954 |
| 2,687,493 | Kirkwood | Aug. 24, 1954 |
| 2,706,796 | Tannenbaum et al. | Apr. 19, 1955 |
| 2,707,248 | Goodrich | Apr. 26, 1955 |

UNITED STATES PATENT OFFICE

CERTIFICATE OF CORRECTION

Patent No. 2,836,761 May 27, 1958

George L. Howitt et al.

It is hereby certified that error appears in the printed specification of the above numbered patent requiring correction and that the said Letters Patent should read as corrected below.

Column 3, line 55, for "through" read -- thought --; column 8, line 16, for "includes" read -- including --; line 19, for "decreases" read -- decrease --; column 9, line 37, for "2" read -- 5 --.

Signed and sealed this 22nd day of July 1958.

(SEAL)

Attest:

KARL H. AXLINE

Attesting Officer

ROBERT C. WATSON

Commissioner of Patents